Figure 12:
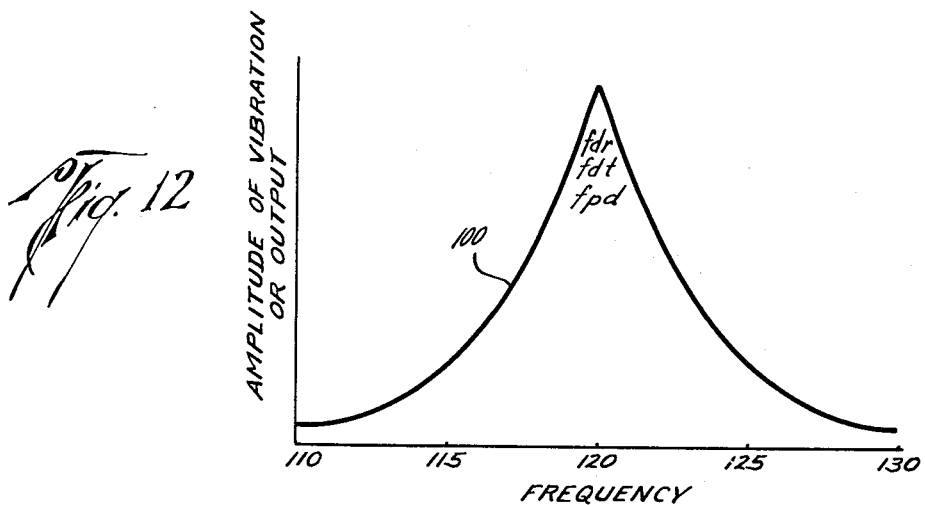

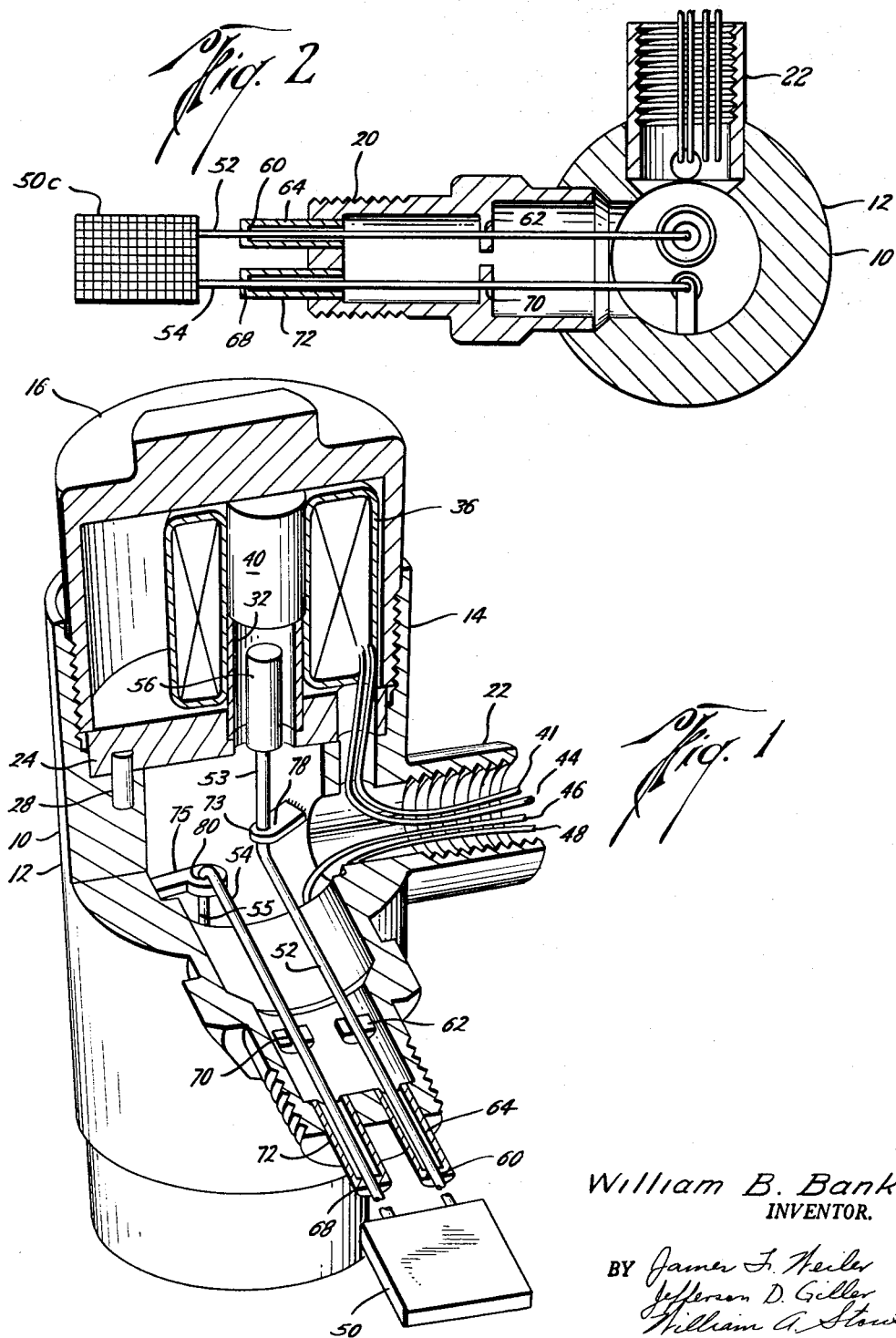

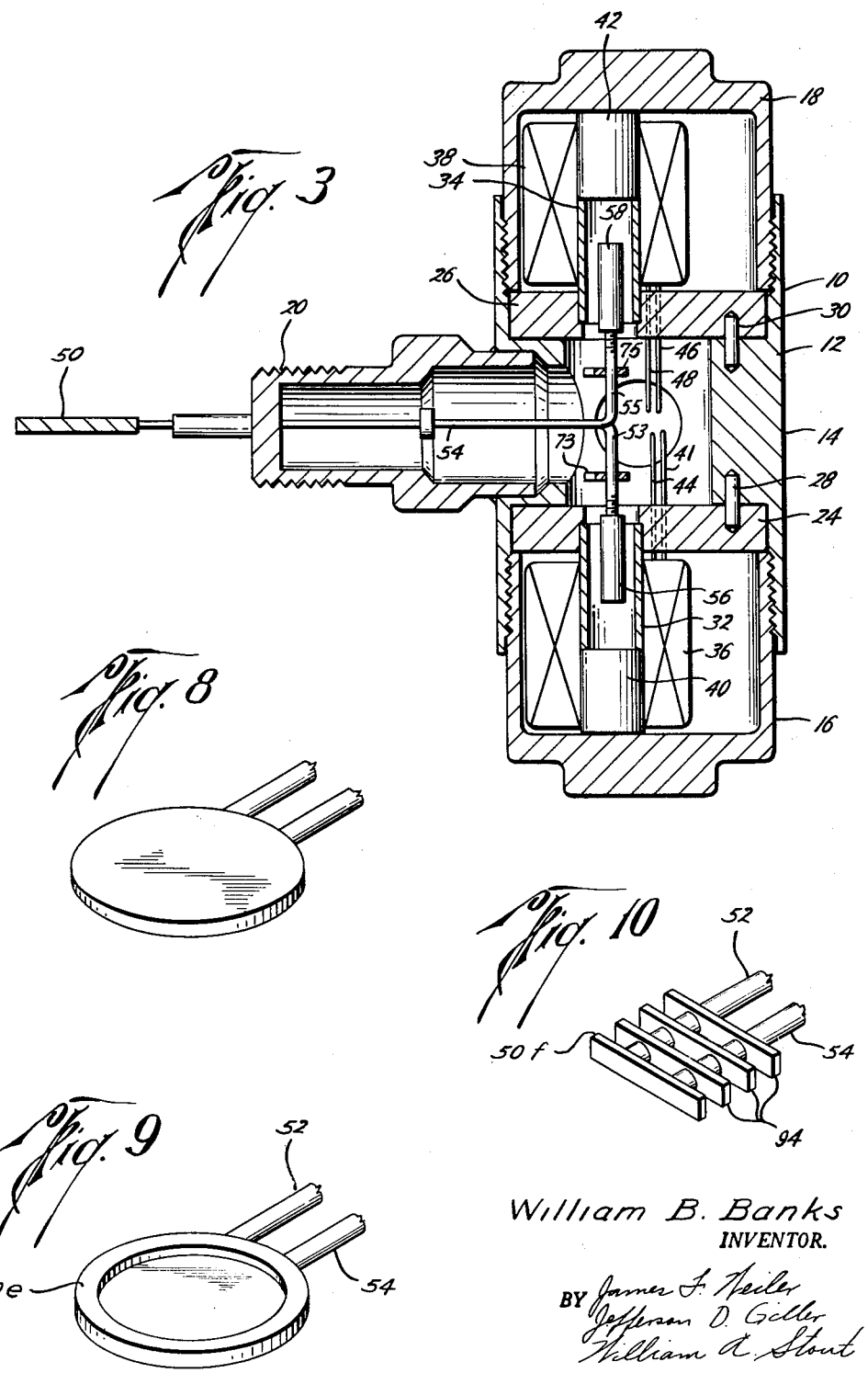

Aug. 25, 1964
W. B. BANKS
3,145,559
METHOD OF AND APPARATUS FOR DETERMINING
PHYSICAL PROPERTIES OF MATERIALS
Filed Dec. 14, 1959
6 Sheets-Sheet 3
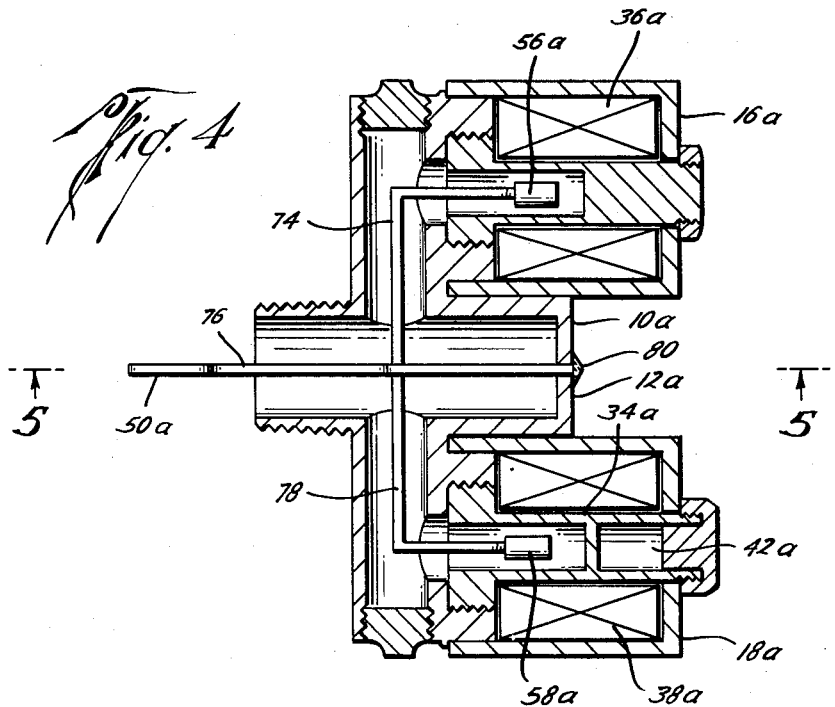
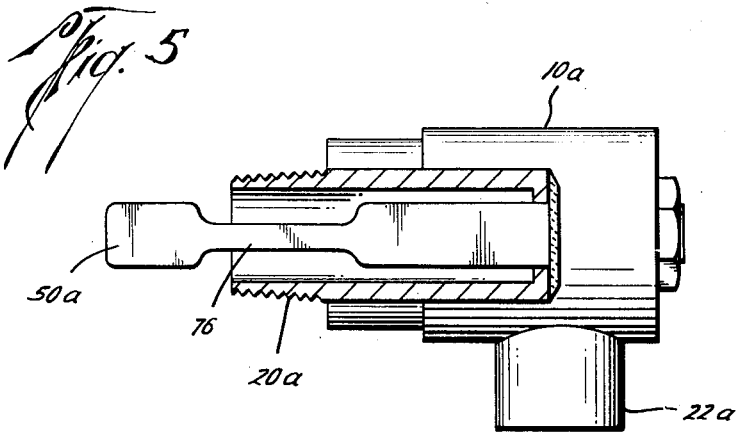
William B. Banks
INVENTOR.
BY
ATTORNEYS

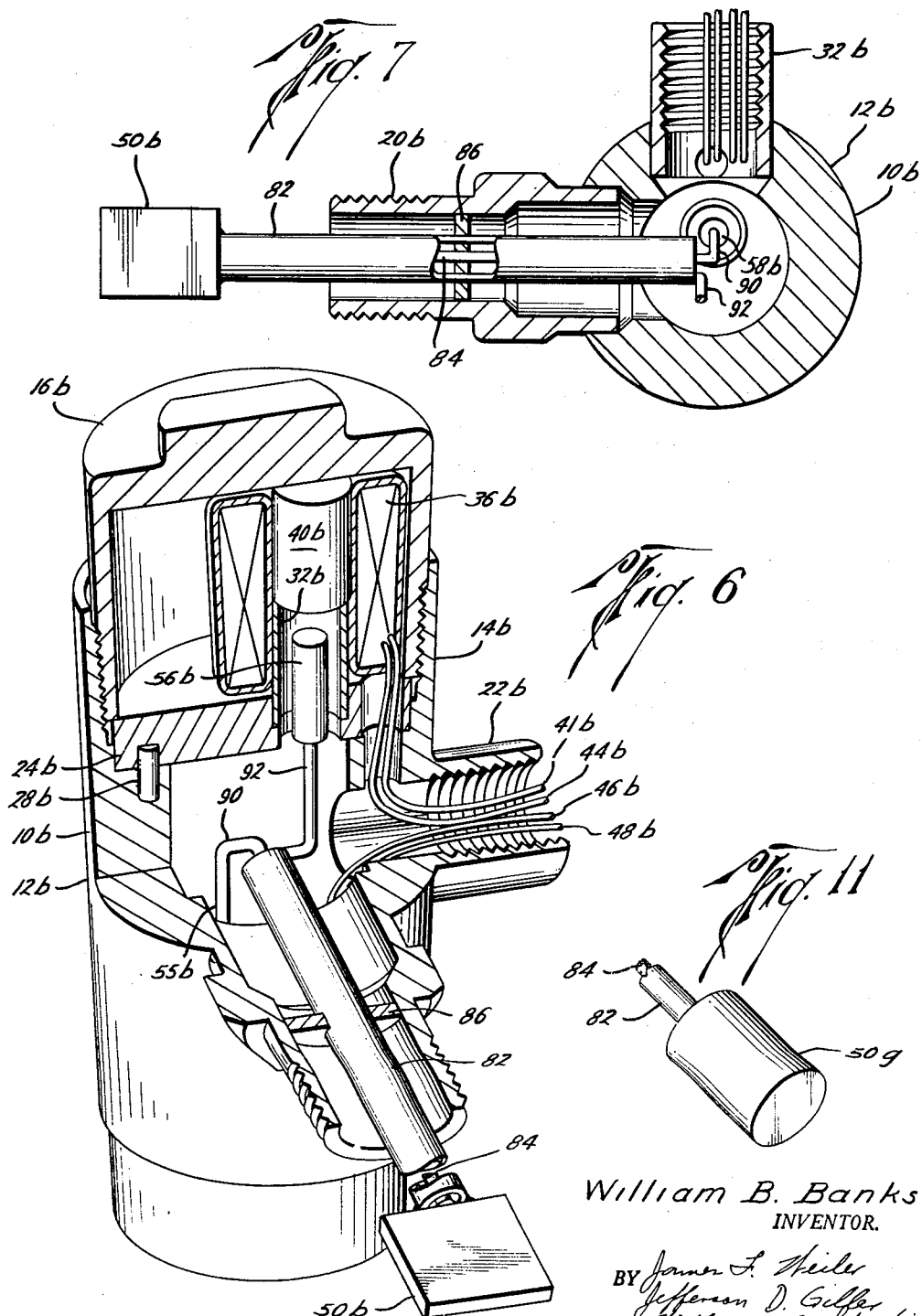

William B. Banks
INVENTOR.

BY
ATTORNEYS

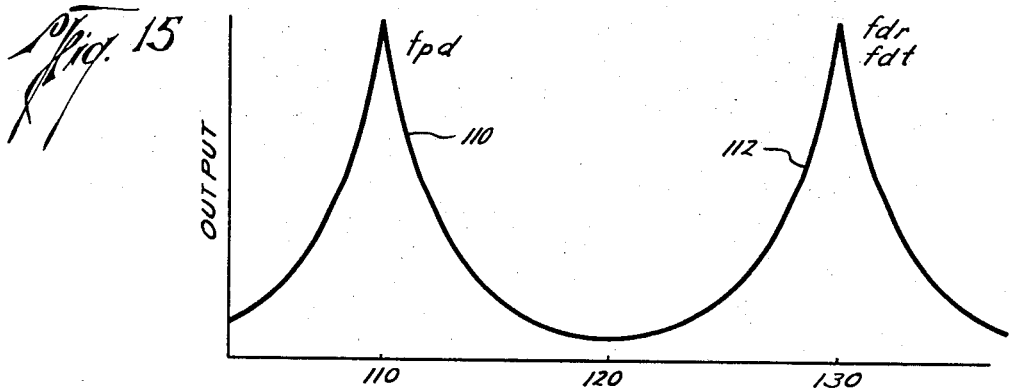
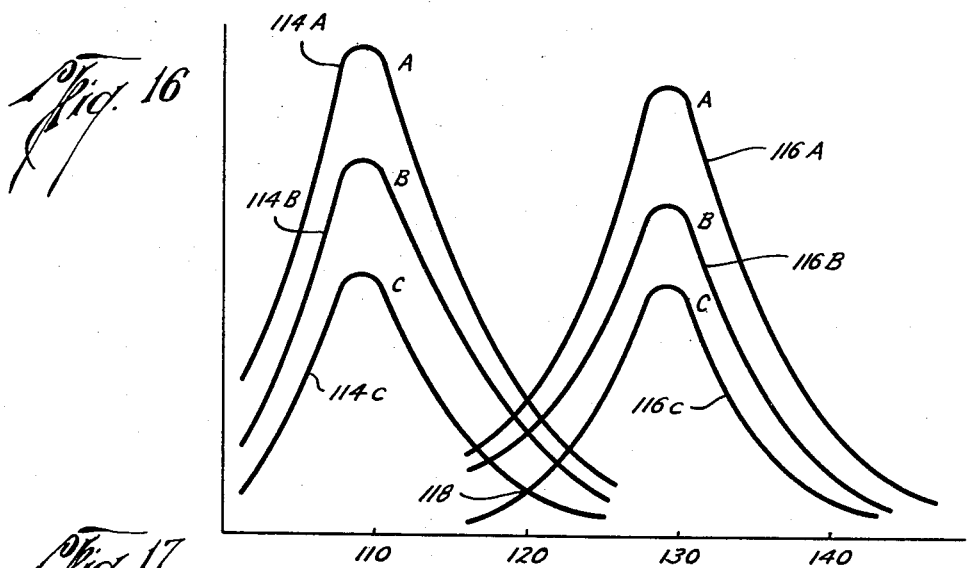
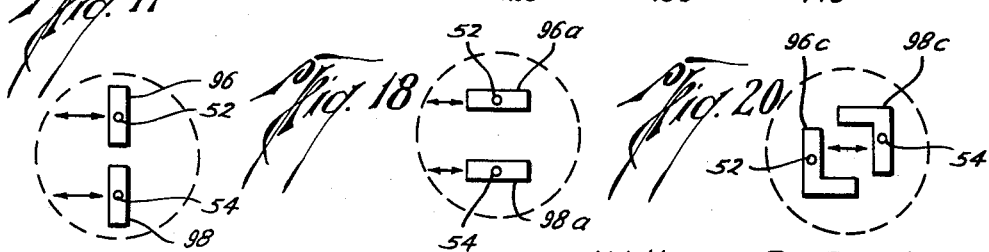
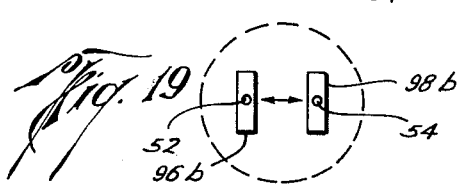
William B. Banks
INVENTOR.

United States Patent Office 3,145,559
Patented Aug. 25, 1964

3,145,559
METHOD OF AND APPARATUS FOR DETERMINING PHYSICAL PROPERTIES OF MATERIALS
William B. Banks, Houston, Tex., assignor to Automation Products, Inc., Houston, Tex., a corporation of Texas
Filed Dec. 14, 1959, Ser. No. 859,302
23 Claims. (Cl. 73—32)

The present invention relates to a method of and apparatus for determining physical properties of materials, and more particularly, relates to a method of and apparatus for the indication and control of the values or changes in the physical properties of materials. This application is a continuation-in-part of my pending application for an Apparatus for Determining Physical Properties of Material, filed December 26, 1957, Serial No. 705,417, now Patent No. 3,100,390, and of my co-pending application in Mass Presence Sensing Device, now Patent No. 2,973,639.

This invention is capable of wide general application in connection with the measurement of various physical properties of materials, such as density, specific gravity, viscosity, and measurement and control of material levels, flow and interface. This invention can be used with liquids, gases, and solids. The apparatus of the present invention is generally directed to providing two vibratory elements, a material sensing means connected to each of the vibratory elements whereupon vibrating the first vibratory element vibration is transmitted through the first vibratory element, through the material sensing means and to the second vibratory element wherein the value or change in the physical property of the material contacting the material sensing means is measured or detected by measuring the change in vibration of the second vibratory element. The present improvements are directed to a method of and an apparatus for determining physical properties of a material by selectively controlling the natural resonant frequencies of the vibratory elements and of the material sensing means and the frequency of operation of the apparatus thereby providing a variety of highly desirable characteristics. A present invention is also directed to a method of and apparatus for determining physical properties of materials by transmitting rotational vibrations in the first vibratory element which is in turn transmitted to the material sensing means and the second vibratory element where changes in the rotational vibration of the second vibratory element is detected.

It is therefore a general object of the present invention to provide vibratory elements and a material sensing means which is adapted to be positioned so as to be acted upon by the material and in which the various natural resonant frequencies of the movable parts, the driver vibratory element, the material sensing means and the detector vibratory element, are selected to make possible a variety of highly desirable response characteristics.

A further object of the present invention is the provision of an improved apparatus and method for determining physical properties of materials by providing a driver vibratory element and a detector vibratory element connected to a material sensing means in which the natural resonant frequency of the material sensing means realtive to the natural resonant frequency of the driver vibratory element and the detector vibratory element is selected to provide the desired characteristics.

A still further object of the present invention is the provision of a method of and an apparatus for determining physical properties of a material by placing a vibratory material sensing device so as to be acted upon by the material and vibrating one of two vibratory elements connected to said material sensing means at a frequency relative to the natural resonant frequencies of the vibratory elements and the material sensing means to provide a desired output characteristic.

A still further object of the present invention is the provision of an apparatus for and a method of determining physical properties of materials by providing a vibratory driver element and vibratory detector element which are connected to a material sensing device and vibrating the driver at a frequency substantially the same as the natural resonant frequency of the material sensing means but relative to the natural resonant frequencies of the vibratory driver element and vibratory detector element to provide the desired response characteristic.

Yet a still further object of the present invention is the provision of an apparatus for determining physical properties of materials by providing various types of material sensing means which are vibrated and acted upon by the material so as to measure various different physical properties and characteristics of the material.

A still further object of the present invention is the provision of an apparatus for and a method of determining physical properties of material by providing two vibratory apparatus, each of which has a material sensing means positioned within the same material and a vibratory driver and vibratory detector connected to its respective material sensing means whereby both the viscosity and specific gravity of the material may be simultaneously determined.

Yet a further object of the present invention is the provision of an apparatus for and a method of determining physical properties of material by providing two vibratory elements, material sensing means connected to one end of each of the vibratory elements, rotationally vibrating the second end of one of the vibratory elements thereby transmitting rotational vibrations from that vibratory element through the material sensing means, and to the second vibratory element, and measuring the change in rotational vibration of the second end of the second vibratory element thereby providing an indication of the measured physical property of the material.

A still further object of the present invention is the provision of an apparatus for and a method of determining physical properties of material by providing two vibratory elements, one of the elements being a tube, and the second element being a rod positioned in the tube, a material sensing means connected to one end of the rod and tube, means for vibrating one of the vibratory elements in a rotational direction, and means adjacent the other vibratory element to measure the rotational vibration of that element.

Figure 13:
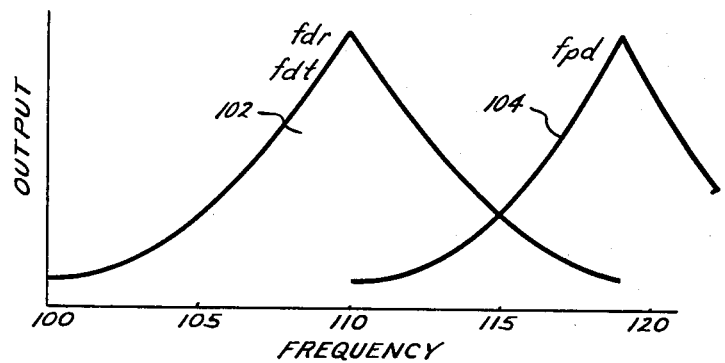

Other and further objects, features and advantages will be apparent from the following description of presently preferred embodiments of the invention, given for the purpose of disclosure, and taken in conjunction with the accompanying drawings, where like character references designate like parts throughout the several views and where, FIGURE 1 is a perspective elevational view, partly in section, of one form of the present invention, FIGURE 2 is a side elevational view, in cross-section, of the invention shown in FIGURE 1 but with a modified type of material sensing means, FIGURE 3 is a side elevational view, in cross-section, of the embodiment of the invention of FIGURE 1, FIGURE 4 is a cross-sectional view showing another modification of the apparatus of the present invention, FIGURE 5 is a cross-sectional view, taken along the line 5—5 of FIGURE 4, FIGURE 6 is a perspective elevational view, partly in section, of still another form of the present invention using a torsional or rotational vibration system, FIGURE 7 is a side elevational view, in cross-section, of the invention shown in FIGURE 6, FIGURE 8 is a perspective view of a modified type of material sensing means which is circular-shaped, FIGURE 9 is a perspective view of another embodiment of a material sensing means which is ring-shaped, FIGURE 10 is yet another type of material sensing means which includes a plurality of parallel spaced plates, FIGURE 11 is a modified type of material sensing means which may be used with the embodiment of the invention of FIGURES 6 and 7, FIGURE 12 is a graph of the output response characteristics of the present invention relative to the excitation or driven frequency when all of the movable components have the same natural resonant frequency, FIGURE 13 is a graph of the output response characteristics of the present invention showing the natural resonant frequency of the material sensing means being different from the natural resonant frequencies of the vibratory driver and vibratory detector elements.

Figure 14:
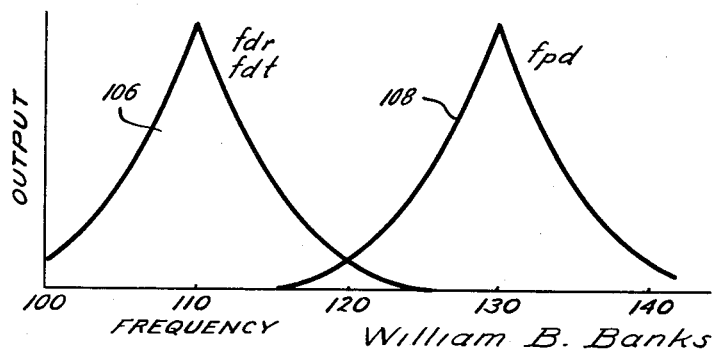

FIGURE 14 is a graph showing the response characteristics in which the excitation frequency of the apparatus is selected midway between the natural resonant frequency of the material sensing means and the natural resonant frequency of the driver and detector vibratory elements, FIGURE 15 shows a graph of the response characteristics of the various movable components of the present invention wherein the material sensing means has a natural resonant frequency different from and lower than a natural resonant frequency of the driver and detector vibratory elements, FIGURE 16 is a graph of the response characteristics of two of the devices of the present invention when placed in the same material, each of the apparatus having different resonant frequency response characteristics, and the graph is shown for various viscosity characteristics for each of the devices, FIGURE 17 is a cross-sectional view of a modification of the material sensing means wherein a paddle is provided on each vibratory element, FIGURE 18 is a cross-sectional view of another modification of separate material sensing means, FIGURE 19 is yet a further cross-sectional view of another modification of the material sensing means, and FIGURE 20 is a cross-sectional view of still a further modification of the material sensing means of the present invention.

The present invention is generally directed to providing two vibratory elements and a material sensing means connected to each of the vibratory elements, the material sensing means being positioned so as to be acted upon by the material to be measured. Means are provided for vibrating the free end of one of the vibratory elements thereby transmitting vibrations along that vibratory element, through the material sensing means, and to the second vibratory element. Measuring or detecting means measure the change in vibration of the free end of the second vibratory element thereby indicating the value or changes in the physical properties of the material which is in contact with the material sensing means.

Referring now to the drawings, and particularly to FIGURES 1, 2 and 3, the reference numeral 10 generally designates one embodiment of an apparatus for determining physical properties of material which is generally described in my copending application, Serial No. 705,417, now Patent No. 3,100,390. Here the apparatus 10 includes a casing or housing 12, which includes a central T-shaped tubular portion 14 and tubular side portions 16 and 18, which for ease of manufacture and maintenance are preferably threadedly connected to the central portion 14.

The central tubular portion 14 is preferably externally threaded at its outer end 20 for threadable connection within a threaded opening in a material container (not shown) to which the apparatus 10 may be attached. Also connected to the central tubular portion 14 is an internally threaded connection 22 adapted for threadable attachment to an electrical conduit (not shown) containing the electrical connections to the apparatus, which will be more fully discussed hereafter.

The motor or driver vibration means assembly is enclosed in and located in the housing end 16. A retaining disc 24, which provides the support for the vibrator assembly, is supported in the central housing portion 14 by dowel pin 28 or other suitable means and secured in place in the end 16. A tubular nonmagnetic sleeve 32 is supported in the retaining disc 24 by counter sunk shoulder and extends into the interior of the end 16. Within the end 16 electromagnetic coil 36 surrounds and is supported by the tubular sleeve 32. A magnetic core 40 is located within the electromagnetic coil 36 at one end of the nonmagnetic sleeve 32. Electrical connections 41 and 44 supply electrical current from an external source to the electromagnetic coil 36 which sets up vibrations in the vibratory driver element 52 which will be more fully described hereinafter.

The detector means or generator assembly is located in the housing end portion 18. A retaining disc 26 provides the support for the detecting means and is secured in the central portion 14 of the housing by dowel pin 30, and in turn supports a nonmagnetic tubular sleeve 34 in the housing end 18. An electromagnetic coil 38 is disposed about one end and supported by the nonmagnetic tubular sleeve 34. A permanent magnet 42 is disposed within the electromagnetic coil 38 at one end of the nonmagnetic sleeve 34 thus providing a magnetic field for the coil 38. Connected to the electromagnetic coil 38 are electrical connections 46 and 48 which carry the signal generated in a detecting coil 38 to electrical indicating or control means. Any suitable electric coil control or detecting means may be used such as control relays or indicating volt meters (not shown) and since these do not constitute part of the invention no further description is deemed necessary.

The vibratory components consist of a material sensing means or paddle 50 and flexible vibratory elements or rods 52 and 54, element 52 being the driving element and element 54 being the pickup or detector element, said rods being attached at one end to the material sensing means 50.

Inside of the housing, rods 52 and 54 are bent to provide extensions 53 and 55, respectively. Extension 53 extends into the tubular element 32 and has a magnetic armature 56 which vibrates in response to the frequency of the electric voltage applied to the electromagnetic coil 36 and in turn causes the flexible rod 52 to vibrate at this applied or excitation frequency. Extension 55 extends into the tubular element 34 in the detecting assembly and has a magnetic armature 58 at its end which vibrates and causes a voltage in coil 38 when rod 54 is vibrated by the material sensing means or paddle 50.

Guides 73 and 75 are secured to the interior of the central portion of the housing 14 and includes an opening 78 and 80, respectively, which slidably receive and guide rod extensions 53 and 55, respectively. These guides limit the direction of vibration of the rods 52 and 54 thereby insuring that extraneous motion is not introduced into the vibrating elements to clutter up the signal received.

Preferably the material sensing means or paddle 50 is positioned exteriorly of the housing 12 in order to be positioned to make satisfactory contact with the material to be measured. The flexible rods 52 and 54 may be supported at their node points so that when one end of a flexible rod is vibrated, the vibration will travel longitudinally along that rod and pass through the node point thereby vibrating the second end of the rod. Thus sealing supports 60 and 62 may be located at the node points of the flexible rod 52 by supporting the rod 52 from the central portion 14 of the housing and by the tubular extensions 64, respectively, or other suitable means. Similarly, flexible rod 54 is supported at its node points by supports 70 and 68 from the housing compartment 14 and tubular extension 72, respectively. Thus a sealing means is provided which seals the interior of the apparatus 10 but yet does not interfere with the operation. Of course, more or less of the node supports could be provided as desired, depending upon the distance it is desired to place the paddle 50 from the body 12.

It is apparent that the interior of the housing structure 12, because of the exterior sealing supports 60 and 68, is closed off and secured from contact with the material to be measured.

Of course, various modifications of this apparatus may be made which include a vibrating driver transmitting vibration to a material sensing means which in turn transmits vibration to a vibrating detector thereby measuring values and changes in the physical properties of the material acting on the material sensing means. FIGURES 4, 5 and 6, 7 illustrate modifications of the present invention, the letters "a" and "b," being applied to parts generally corresponding to those in FIGURES 1–3, inclusive, for convenience of reference. Referring now to FIGURES 4 and 5, the modification therein is generally disclosed in my copending application, now Patent No. 2,973,639, and generally includes an electromagnetic coil 36a for vibrating armature 56a and vibratory element 74 which is secured to and vibrates material sensing means 76, a vibratory element 78 which receives vibration from the material sensing means 76 and in turn vibrates armature 58a where a change in vibration is detected through the magnetic coil 38a. The material sensing means or paddle 76 may be attached to the casing in any suitable manner, and welded or otherwise attached such as provided by support 80. The vibratory driver 74 and vibratory pickup 78 are secured to the paddle 76 thereby providing support for these elements while allowing them to be free to vibrate thus passing a vibration through the driver element 74 to the paddle 76 and to the detector element 78 which measures the value or change in vibration caused by changes in the physical properties of materials in contact with the material sensing means 76.

Referring now to FIGURES 6 and 7, a further improvement of the present invention is shown in which the vibratory elements and material sensing means are vibrated in a rotational or torsional manner so as to measure the physical properties of materials. The vibratory elements in this improvement include a tubular member 82 and a flexible element such as a rod 84, both of which are connected at one end to the material sensing means 50b and are axially rotated to transmit torsional vibrations along these vibratory elements to and from the paddle 50b. A support 86 is provided which supports both the vibratory tube 82 and the vibratory rod 84 from the housing and supports these vibratory elements at a node point thereby allowing vibratory waves to pass through the vibratory elements and yet prevent the inside of the apparatus 10b from being contaminated by the material being tested. In order to provide for the transfer of torsional vibrations from the flexible elements 82 and 84 to the detecting assembly and from the vibration assembly, right angle extension connections 90 and 92 are provided, 90 being connected between vibratory element 84 and the magnetic armature 58b in the detecting assembly while extension 92 is connected from vibratory element 82 to armature 56b which vibrates in response to the frequency of the electric voltage applied to the electromagnetic coil 36b. Thus, when armature 56b is vibrated a torsional or rotational vibration is set up in the tube 82 which is transmitted to the paddle 50b and then transmitted to the paddle 50b and then transmitted torsionally to rod 84 which sets armature 58b (FIGURE 7) in vibration whereby detector coil 38b (not shown) measures the change in the physical properties of the materials contacting the rotating paddle 50b. This improvement of FIGURES 6 and 7 allows a longer extension of the paddle 50b into material vessels and containers. Of course, either of the vibratory elements 82 and 84 may be the driver of detector element.

Various modifications of the material sensing means 50 may be made which more accurately measure the specific physical property of the material that is desired to be measured. Material sensing means 50 (FIGURES 1 and 3) and 50b (FIGURES 6 and 7), utilizing a flat paddle, have been found satisfactory for measuring such properties as material level, material interfaces, rate of flow, and changes in material density. Generally, the perimeter of the material sensing means governs the response to the shear strength of the media in which it is vibrated which is a measure of the viscosity. The broad side area of the material sensing device generally determines the response to the specific gravity of the material. Therefore, if desired, the effect of specific gravity changes can be minimized when measuring viscosity by positioning the paddle so that it vibrates endwise or shape the material sensing device so that the broad side area is negligible while the perimeter or shear responsive structure is more prominent. And also the effect of viscosity changes can be minimized when measuring specific gravity by proper selection of the direction of vibration and shape of the paddle or material sensing device. Material sensing device 50c (FIGURE 2) is a screen type structure and when vibrated broad side in a material is advantageous in detecting and measuring the value of and changes in the viscosity of that material.

Paddle 50d of FIGURE 8 illustrates a circular disc-shaped paddle wherein the largest area is contained within the relatively smallest perimeter and thus the effect of viscosity changes are minimized so that this shaped structure is particularly adapted for measuring the values or changes in the specific gravity of a material when the paddle 50d is vibrated broadside to the material. Material sensing device 50e of FIGURE 9 is shaped as a ring so that the broadside area is negligible as compared with the perimeter and therefore this shaped paddle is advantageous in measuring changes in viscosity. Another modification is paddle 50f shown in FIGURE 10 which consists of a plurality of parallel plates 94 adapted to be vibrated broadside to the material thereby measuring viscosity of the material and also measuring the ability of the material to pass through the paddle 50f between the closely spaced plates 94.

While the material sensing devices 50a, 50b, 50c, 50d, 50e, and 50f are shown as connected to vibratory elements 52 and 54 and thus used with the embodiments of FIGURES 1–3 they can also be used with the modification of FIGURES 4 and 5 by connection to 76 and they can be used with the invention of FIGURES 6 and 7 by attaching the paddles to the vibratory elements 82 and 84. Paddle 50g of FIGURE 11 is a cylindrical shaped device for use with the invention of FIGURES 6 and 7 and is alternately rotated because of its great perimeter area in contact with material and thus is advantageous for measuring viscosity. Of course, many other and various shapes of material sensing devices may be used to measure the different physical properties of materials.

And another modification that could be made to the apparatus of the present invention is to provide a separate material sensing means on the end of each of the vibratory elements. This arrangement would measure the ability of the media or material to transmit the vibration from one paddle to the other. This ability would be a function of the specific gravity and viscosity of the material and with the gap between the separate paddles held to a few thousandths of an inch the apparatus could also measure the lubrication qualities of a product. Various modifications of separate structures are shown in FIGURES 17–20, inclusive. FIGURE 17 is a cross-sectional view showing two material sensing elements 96 and 98, connected to vibratory elements 52 and 54 respectively. The direction of rotation of these paddles are as indicated showing that they are vibrated broadside and thus transmit vibrations one to the other through the material in which they are positioned.

FIGURE 18 shows a modification of the separate paddles wherein paddles 96a and 98a are connected to flexible vibrating elements 52 and 54, respectively, and are vibrated endwise. Another dual paddle arrangement is shown in FIGURE 19 where paddles 96a and 98a are vibrated broadside, but in a direction toward each other. FIGURE 20 illustrates still a further modification wherein the direction of vibration of dual paddles are toward each other, but where the paddles 96c and 98c are in angle form.

Generally in the operation of the present invention, a suitable electric source is connected by the electrical conductors 41 and 44 to the electromagnetic coil 36 which constitutes the motor or vibrator means by which the vibratory element is caused to vibrate. When the electromagnetic coil 36 is energized by an alternating current the armature 56 is attracted and released, so as to cause the vibratory element 52 to vibrate at the frequency of the applied electrical source. Of course, other means of causing vibration could be used. Thus the vibration of the vibratory element 52 is transmitted from its armature to the material sensing means 50 and this vibration will then be transmitted to the detector vibrating element 54 and to its armature 58. The electromagnetic or pickup coil 38 thus generates a voltage caused by the vibration of the generator armature 58 in the magnetic field of the permanent magnet 42. The signal from this detecting or pickup coil 38 is transmitted through electrical conductors 46 and 48 to any suitable type of electric circuit having electrical indicating or control means such as a voltmeter or a relay coil (not shown). Thus the value or changes in the physical properties of the material which contacts the material sensing means 50 is reflected by the amount of change in the vibration transmitted to the detector vibrating element 54.

Generally, a 60 cycle alternating source is applied to the electromagnetic coil, as it is generally conveniently available, thus vibrating the vibratory elements of apparatus 10 at 60 cycles. However, the natural resonant frequencies of each of the three mechanical oscillating components, the driving vibratory element, the material sensing means, and the detector vibratory element may be selected to provide a variety of highly desirable characteristics. Since the apparatus is normally vibrated or excited at a certain frequency, normally 60 cycles per second which results in a 120 cycle per second vibration, the precise selection of the natural resonant frequencies of these vibrating components in relation to the excitation frequency and in relation to the natural resonant frequency of each other will determine the operational characteristics of a given instrument.

Referring now to FIGURE 12, the amplitude of vibration of each of the oscillating components, the driver vibratory element, the material sensing means, and the detector vibratory element is shown as graph 100 and is plotted against the excitation or frequency of vibration of the applied source with all three of the oscillating components having an identical resonant frequency, here selected as 120 vibrations per second. From this graph it is noted that maximum vibration or maximum output is obtained when the excitation frequency of the unit is 120 vibrations per second, the same as the natural resonant frequencies of the various oscillating components. From this graph, it can be seen that maximum sensitivity can be obtained by operating the movable components of the unit at their natural resonant frequencies. And an empirical expression has been derived which approximates the output response of the unit where $$\text{output (neglecting damping)} = \frac{1}{(F-fdr)(F-fdt)(F-fpd)}$$

where F equals the excitation frequency of two times the driving frequency applied to the unit, fdr is the natural resonant frequency of the driver vibratory element, fdt is the natural resonant frequency of the detector vibratory element, and fpd is the natural resonant frequency of the material sensing device or paddle. Thus it can be seen that by the selective control of the natural resonant frequencies of the oscillating components a variety of highly desirable characteristics may be obtained.

It is to be noted that when the material sensing means is gradually submerged in the material to be measured weight is in effect added to the paddle thereby decreasing the natural resonant frequency of the paddle. It is also to be noted that a change in the physical properties of the material will only affect the factor (F−fpd) and therefore the output of the unit equals $$\frac{K}{F-fpd}$$

where K is a constant. In this case by selective control of the natural resonance frequency of the material sensing means 50 (fpd) the response and sensitivity of the output may be controlled. Referring now to FIGURE 13, the natural resonant frequencies of the driver vibratory element and the detector vibratory element have been selected so as to provide the response curve 102 as shown and the natural resonant frequency of the material sensing means 50 has been selected as 120 vibrations per second so as to provide the response curve 104 as shown. Assuming that the excitation frequency is 120 vibrations per second, the vibration or output of curve 104 is at a maximum. If the paddle 50 is submerged in a material the effect is to add weight to the paddle and decrease its natural resonant frequency and thus the curve 104 will shift to the left on the graph in FIGURE 13 and it is noted that this unit then gives a decrease in output, assuming a constant excitation frequency of 120 vibrations per second, as it submerges. It is also to be noted in this embodiment that a small percentage change in the factor fpd will result in a larger percentage change in the output than the example of the selected components in FIGURE 12. It should also be noted that a change in the specific gravity or viscosity or other properties of the materials surrounding the paddle will in effect change the fpd and likewise affect the output of the unit.

Referring now to FIGURE 14, and assuming an excitation frequency of 120 vibrations per second the natural resonant frequency characteristics of the driver vibratory element and the detector vibratory element may be selected to provide a characteristic curve such as 106 and the material sensing means 50 may be selected to provide a characteristic curve such as 108 with a natural resonance frequency of 130 vibrations per second. In this case again as the paddle becomes submerged in a heavier material weight is in effect added to the paddle lowering the natural resonant frequency and in this case the output, $$\frac{K}{F-fpd}$$

will increase. (A negative sign indicates resonance above F and a positive sign indicates resonance below F). Thus it can be seen that this unit will give an increase in output as it submerges; thus, either the unit in FIGURE 13 or FIGURE 14 may be utilized depending upon the type of operating characteristics which would be desired in any particular application.

Preferably, for measuring such physical properties as specific gravity and changes in viscosity it is preferable to have the submerged natural resonant frequency of the material sensing means equal to the excitation frequency so that comparatively small changes in these physical properties will result in comparatively large changes in the detected output and in that case the apparatus of FIGURE 13 would be used.

Furthermore, benefits other than the control of operational characteristics may be achieved through the selective control of the natural resonant frequency of these oscillating components. For instance, by selective control of the natural resonant frequency of the movable components changes in external effects such as temperature, frequency, and external vibration, can be controlled so they will have little or no effect on the output thereby providing an instrument that is highly stable. For example, referring now to FIGURE 15, for a system having a normal excitation frequency of 120 cycles per second vibration, by selecting the natural resonant frequency of the paddle 50 below the excitation frequency with response characteristics such as shown in graph 110, the natural resonant frequency of the vibratory elements, the driver, and the detector, are selected at a frequency above the natural resonant frequency such as shown in graph 112. Thus, if the temperature increases, the modulus of elasticity of all of the vibrating components, the driver, the detector and the paddle would decrease causing the natural resonant frequencies of each of these components to decrease. However, since the $$\text{output} = \frac{1}{(F-fdr)(F-fdt)(F-fpd)}$$

the output will remain substantially unchanged throughout a temperature change since while the output or amplitude of vibration of the paddle 50 will decrease, the output or amplitude of vibration of the vibratory elements, the driver and the detector, will increase since they are shifted toward the excitation frequency. Thus, the change in these factors will compensate each other so as to provide an instrument of great temperature stability.

Also, where the driving or excitation frequency F is not well regulated the various components can be selected to operate as shown in FIGURE 15 by selecting their characteristics so as to produce the characteristic response curves 110 and 112. Thus if the excitation frequency increases, while the amplitude of vibration of the driver vibratory element and the detector vibratory element would tend to be increased, the amplitude of vibration of the material sensing means 50 would be decreased, thus the system as a whole would compensate for the vibration in the excitation frequency, with virtually no change in output.

As previously mentioned, the device of the present invention will measure the viscosity or specific gravity of a media which is in contact with the material sensing means 50. Another important application of the present device is realized through the use of using two separate apparatus 10, each having a driver vibratory element, paddle and detector vibratory element, in which the paddle 50 of each apparatus is placed in contact with the same material to be tested whereby either the values or changes in the viscosity and/or specific gravity of the material tested could be simultaneously measured by the selective control of the natural resonant frequency of the vibrating components of each device.

Referring now to FIGURE 16, assuming an excitation frequency of 120 c.p.s. vibration, one of the instruments is selected where the paddle 50, which is the only vibrating element in contact with the media, has a natural resonant frequency in air of 140 c.p.s. and while submerged in the material to be measured has a natural resonant frequency of 130 c.p.s. Thus this instrument would have an output characteristic curve as shown in curves 116a, 116b and 116c, depending upon the viscosities a, b, and c thus resulting in a family of characteristic curves having a maximum response at 130 c.p.s. and producing a different family of curves depending upon the viscosity of the material. Similarly, a second instrument is selected which when submerged in the material to be measured has a natural resonant maximum frequency of 110 c.p.s. vibration and would provide curves 114a, 114b, and 114c with respect to viscosities a, b, and c. Therefore, since both of the units are in the same material they will be measuring the same specific gravity and the same viscosity. Thus, the combined signals from each of the units shown in FIGURE 16 which can be indicated by the intersection of corresponding curves 114 and 116 will indicate both the specific gravity and viscosity of the material, the specific gravity being measured along the horizontal axis of the graph and the viscosity being measured along the vertical edge of the graph. Thus for instance, point 118, the intersection between characteristic curves 114c and 116c would have a viscosity of c which could be measured along the vertical axis of the graph and which would be determined by the intersection point 118 as that is the only single product that satisfies both unit outputs and that point would also be determinative of the specific gravity as when the specific gravity of the material changes the point 118 would merely shift horizontally and thus would give an indication along the horizontal axis of the specific gravity.

In operation, the apparatus 10, may be screwed into an opening in a material container such as a tank, a pipe line, or any other material container (not shown) and is preferably secured thereto by the threads 20 with the material sensing means 50 projecting into the material container. It is to be noted that this apparatus may be attached to the top, bottom, side or at any other desired position on the material container. Electricity is connected by electrical conductors 41 and 44 to the electromagnetic coil which constitutes the motor or vibrator means by which the vibratory element 52 is caused to vibrate. When the electromagnetic coil 36 is energized by an alternating current the armature 56 is attracted and released, to cause the vibratory element 52 to vibrate at the frequency of the electric voltage applied to the electromagnetic coil 36. The vibration from the vibratory element 52 is transmitted from its armature to a material sensing means 50 and then to the vibratory element 54 and to its connected armature 58. The electromagnetic or detector coil 38 generates a voltage caused by the vibration of the generator armature 58 in the magnetic field of the permanent magnet 42. The signal from this detecting or pickup coil 38 is transmitted through the electrical conductors 46 and 48 to any convenient type of electrical circuit having electrical indicating or control means such as a voltmeter or a relay control.

It is to be noted that the operating characteristics of the apparatus 10 will depend upon the selected natural resonant frequency of the vibrating elements, the driving vibratory element 52, the material sensing means 50, and the vibratory detector element 54. The relationship of the natural resonant frequencies of these components with each other and with the excitation frequency applied to the electromagnetic coil 36 may be selected to provide the desired characteristics under the operating conditions to be encountered.

It is also to be noted that various shapes and contours of the material sensing means 50 may be used depending upon the characteristics of the material to be measured. Furthermore, the direction of vibration of these material sensing means 50 may be selected to provide the desired characteristics.

It is noted that while the invention of FIGURES 4 and 5 operates similarly to the above described operation of the invention of FIGURES 1-3 to transmit longitudinal vibrations along the vibratory elements 52 and 54 of FIGURES 1-3 and 74 and 78 of FIGURES 4 and 5, the invention of FIGURES 6 and 7 transmit rotational or torsional vibrations along the vibratory elements 82 and 84. Therefore, the material sensing means 50b (FIGURE 6) is alternately rotated in one direction and then in the other. Thus, referring to FIGURES 6 and 7, the electromagnetic coil 36b is energized by an alternating current supplied by electrical conductors 41b and 44b which attract and release armature 56b. Thus extension 92 is vibrated at the frequency of the source applied to coil 36b, and since it is a right angle connection to vibratory tube 82 imparts a rotational or torsional vibration through tube 82, through paddle 50b, and to rod 84. A right angle extension 90 receives the rotational vibrations from rod 84 causing armature 58b to vibrate which is measured by the voltage or frequency change caused in coil 38b (not shown).

Of course, the apparatus must be calibrated in terms of the measured physical properties to accurately determine the values which are measured.

It is apparent that the invention, as preferably constructed, is capable of use with a wide variety of different materials whose density, rate of flow, viscosity or other physical characteristics will vary so as to result in an increase or decrease in the effect exerted on the vibratory paddle 50 so as to change the amplitude or frequency of vibration.

It is believed that the method of the invention is apparent from the foregoing description of presently preferred apparatus of the invention. The method, however, comprises the steps of placing a material sensing means which is connected to one end of two vibratory elements into position in a material container for contact with the material therein, and selecting the natural resonance frequencies of the vibratory elements and material sensing means in relation to each other and the excitation frequency to produce the desired operating characteristics.

The method further comprehends selecting the natural resonant frequency of the material sensing means different from the natural resonant frequency of the vibratory elements. The method further comprehends selecting the natural resonant frequency of the material sensing means different from the natural resonant frequency of the vibrating elements, and operating the device at an excitation frequency which is between the natural resonant frequency of the material sensing means and the vibratory elements.

The method further comprehends the steps of placing a material sensing means which is connected to one end of two vibratory elements into position in a material container for contact with the material therein, vibrating one end of one of the vibratory elements in a rotational direction thereby imparting torsional vibrations to said one vibratory element, to the material sensing means and to the other vibratory element, and measuring the vibration of the second vibratory element thereby indicating the measured physical property of the material.

The method further comprehends operating two units in a material, wherein each of the units contains a driving vibratory element, material sensing means, and a detector vibratory element, selecting the natural resonant frequency of the material sensing means of one of the units such that the natural resonant frequency of that unit is greater than the excitation frequency of the units, and selecting the natural resonant frequency of the second unit wherein it is less than the excitation frequency of the units, and comparing the output from the units whereby more than one physical property of the material can simultaneously be measured.

The present invention, therefore, is well adapted to carry out the objects and attain the ends and advantages mentioned as well as others inherent therein. While presently preferred embodiments of the invention are given for the purpose of disclosure, numerous changes in the details of construction, arrangement of parts and steps of the process may be made which will readily suggest themselves to those skilled in the art which are encompassed within the spirit of the invention and the scope of the appended claims.

What is claimed is:

1. A method of determining the physical properties of a material comprising, placing a material physical characteristic sensing means connected to one end of each of two vibratory elements into position for contact with the material, vibrating the free end of one of the vibratory elements at a frequency different from the natural resonant frequency of the material physical characteristic sensing device, and measuring a change in one of the characteristics of vibration of the free end of the second vibratory element thereby indicating a measured physical property of the material.

2. A method of determining the physical properties of a material comprising, placing a material physical characteristic sensing device connected to one end of each of two vibratory elements into position for contact with the material, vibrating the free end of one of the vibratory elements at a frequency different from he natural resonant frequency of the vibratory elements, and measuring the change in the amplitude of vibration of the free end of the second vibratory element thereby indicating a measured physical property of the material.

3. A method of determining the physical properties of a material comprising, placing a material physical characteristic sensing device connected to one end of each of two vibratory elements into position for contact with the material, vibrating the free end of one of the vibratory elements at a frequency substantially the same as the resonant frequency of the material sensing device when submerged in the material, and measuring the change in one of the charcteristics of vibration of the free end of the second vibratory element thereby indicating a measured physical property of the material.

4. A method of determining the physical properties of a material comprising, placing a material physical characteristic sensing device connected to one end of each of two flexible vibratory elements into position for contact with the material, vibrating the free end of one of the flexible elements at a frequency between the natural resonant frequency of the vibratory elements and the natural resonant frequency of the material sensing device, and measuring the change in one of the characteristics of vibration of the free end of the second vibratory element thereby indicating a measured physical property of the material.

5. An appartus for determining physical properties of a material comprising, two vibratory elements material physical characteristic sensing means secured to one end of each of said vibratory elements for transmitting vibration from one vibratory element to the other vibratory element when in contact with the material, said material sensing means having a natural resonant frequency different from the natural reasont frequencies of the vibratory elements, vibration means adjacent to one of said vibratory elements for vibrating said one elment thereby transmitting vibration to said material sensing means and the second vibratory element, and measuring means for measuring one of the characteristics of vibration of the second vibratory element.

6. The invention of claim 5 wherein the material sensing means includes a screen structure.

7. The invention of claim 5 wherein the material sensing means includes a plurality of parallel plates, each of said plates being secured to each of the vibratory elements.

8. The invention of claim 5 wherein the material sensing means includes a ring connected to each of the vibratory elements thereby measuring the viscosity of the material.

9. An apparatus for determining physical properties of a material comprising, two vibratory elements, each element supported at a point intermediate their ends, separate material physical characteristic sensing means secured to each of the vibratory elements on one side of the support points but positioned adjacent each other to transmit vibration from one vibratory element to the other vibratory element when in contact with the material, vibration means on the second side of said support points and adjacent one of said vibratory elements for vibrating said one element thereby transmitting vibration to said material sensing means and the second vibratory element, and means for measuring the amplitude of vibration of the second vibratory element.

10. The improvement in a method of determining a physical property of a material in a container which includes placing a material physical characteristic sensing device connected to one end of each of two vibratory elements for transmitting vibration between said elements into position in the container for contact with the material, supporting the vibratory elements proximate a node point of the natural resonant frequency of said elements, vibrating the free end of one of the vibratory elements at a frequency different from the natural resonant frequency of the vibratory elements and the material sensing device, measuring the change in the amplitude of vibration of the free end of the second vibratory element thereby indicating a measured physical property of the material.

11. The improvement in a method of determining a physical property of a material in a container which includes placing a material physical characteristic sensing device connected to one end of each of two vibratory elements into position in the container for contact with the material, supporting the vibratory elements proximate a node point of their own resonant frequency, vibrating the free end of one of the vibratory elements at a frequency substantially equal to the natural resonant frequency of the material sensing device when it is submerged in the material, and measuring the change in one of the characteristics of vibration of the free end of the second vibratory element thereby indicating a measured physical property of the material.

12. The improvement in an apparatus for determining physical properties of a material including two vibratory elements supported proximate a node point of their natural resonant frequency, material physical characteristic sensing means secured to each of the vibratory elements on a first side of the node points and for transmitting vibration from one vibratory element to the other vibratory element when in contact with the material, vibration means on the second side of said node point adjacent one of said vibratory elements for vibrating said one vibratory element at a frequency substantially the same as the resonant frequency of the material sensing means, said vibratory elements having a natural resonant frequency different from the natural resonant frequency of said material sensing means, and detecting means on said second side of the node points and adjacent the second vibratory element for detecting a change in one of the characteristics of vibration of the second vibratory element.

13. An apparatus for determining physical properties of a material comprising, two flexible vibratory elements, support means connected to said vibratory elements intermediate the ends of said vibratory means, material physical characteristic sensing means secured to one end of each of said flexible elements transmitting vibration from one element to the other element when in contact with the material, rotational vibration means adjacent to the second end of one of said vibratory elements for rotationally vibrating said one element thereby rotationally vibrating said material sensing means and the other vibratory element, and detecting means adjacent the other vibratory element for detecting a change in the amplitude of rotational vibration of the other vibratory element.

14. The invention of claim 13 wherein one of the vibratory elements is a tube and the other vibratory element is a rod.

15. An apparatus for determining physical properties of a material comprising, two vibratory elements, said vibratory elements supported adjacent a node point of the natural resonant frequency of said vibratory elements, one of said vibratory elements including a tubular member and the other vibratory element including a rod, material physical characteristic sensing means secured to one end of each of said vibratory elements for transmitting vibration from one element to the other element, a right angle extension connected to each of said vibratory elements, electromagnetic vibrating means positioned adjacent one of said right angle extensions for rotationally vibrating one of said vibratory elements thereby rotationally vibrating said material sensing means and the other vibratory element, and an electromagnetic coil means positioned adjacent the other right angle extension for detecting a change in the amplitude of rotational vibration of the other vibratory element.

16. An apparatus for simultaneously determining the viscosity and specific gravity of a material comprising; first and second vibratory units, each of said vibratory units including two vibratory elements, and a material physical characteristic sensing means secured to one end of each of the vibratory elements for transmitting vibration from one element to the other element when in contact with the material; the natural resonance frequency of the material sensing means of the first vibratory unit being different from the natural resonance frequency of the material sensing means of the second vibratory element; vibration means adjacent one of the vibratory elements in each vibratory unit for vibrating said one element and thereby transmitting vibration to the material sensing means and the second vibratory element in each vibratory unit, and means adjacent the second vibratory element of each vibratory unit for measuring the amplitude of vibration of the second vibratory element of each unit thereby indicating the specific gravity and viscosity of said material.

17. The invention of claim 16 wherein the vibration means operates at a frequency between the natural resonant frequencies of the material sensing means of each vibratory unit.

18. An apparatus for determining a physical property of a material comprising
  two flexible vibratory elements, each of said elements supported at a point intermediate its ends,
  material physical characteristic sensing means secured to one end of each of said vibratory elements on one side of said support points for transmitting vibrations from one vibratory element to the other vibratory element,
  vibration means having a fixed vibration frequency and positioned adjacent one of said vibratory elements on the second side of said support points for vibrating said one vibratory element thereby transmitting vibration to said material sensing means and the second vibratory element,
  said material physical characteristic sensing means having a natural resonant frequency different from the vibration frequency of the vibration means,
  measuring means positioned adjacent said second vibratory element on the second side of said support points for measuring the amplitude of vibration of the second vibratory element.

19. An apparatus for determining physical properties of a material comprising,
  two flexible vibratory elements, each of said elements supported at a point intermediate its ends and proximate a node point of the natural resonant frequency of the vibratory elements,
  material physical characteristic sensing means secured to one end of each of said vibratory elements on one side of said support points for transmitting vibrations from one vibratory element to the other vibratory element,
  electro-magnetic vibration means having a fixed vibration frequency and positioned adjacent one of said vibratory elements on the second side of said support points for vibrating said one vibratory element thereby transmitting vibration to said material sensing means and to the second vibratory element,
  said material sensing means having a natural resonant frequency different from the vibration frequency of the electro-magnetic vibration means, and electro-magnetic coil means adjacent the second vibratory element on the second side of said support points for measuring the amplitude of vibration of said second vibratory element.

20. An apparatus for determining physical properties of a material comprising, two flexible vibratory elements, each of said elements supported intermedeiate its ends, material physical characteristic sensing means secured to one end of each of said vibratory elements on one side of said support points for transmitting vibrations from one vibratory element to the other vibratory element, vibration means having a fixed vibration frequency and positioned adjacent one of said vibratory elements on the second side of said support points for vibrating said one vibratory element thereby transmitting vibration to said material sensing means and the second vibratory element, said material sensing means having a natural resonant frequency different from the vibration frequency of the vibration means, said vibratory elements having a natural resonant frequency different from the vibration frequency of said vibration means, and measuring means on the second side of said support points and adjacent the other vibratory element for detecting a change in the amplitude of vibration of the other vibratory element.

21. The improvement in an apparatus for determining physical properties of a material which includes two flexible vibratory elements supported proximate the node point of their natural resonant frequency, material physical characteristic sensing means secured to each of the flexible elements on a first side of the node points for transmitting vibration from one vibratory element to the other vibratory element comprising, vibration means on the second side of said node points adjacent one of the vibratory elements for vibrating said one vibratory element, said vibration means having a fixed vibration frequency, the material sensing means having a natural resonant frequency different from the vibration frequency of the vibration means, the material sensing means having a natural resonant frequency different from the natural resonant frequency of the flexible vibratory elements, and measuring means on the second side of said node points and adjacent the other vibratory element for detecting a change in the amplitude of vibration of the other vibratory element.

22. The invention of claim 21 wherein the natural resonant frequency of the flexible vibratory elements is different from the vibration frequency of the vibration means.

23. An apparatus for determining physical properties of a material comprising, two vibratory elements, material physical characteristic sensing means secured to one end of each of said vibratory elements, said material sensing means being fixedly supported at one end, vibration means having a fixed vibration frequency positioned adjacent one of said vibratory elements for vibrating said one vibratory element thereby transmiting vibration to said material sensing means, said material sensing means having a natural resonant frequency different from the fixed vibration frequency of the vibration means, said material sensing means having a natural resonant frequency different from the natural resonant frequency of the vibratory elements, and means adjacent the second vibratory element for measuring the amplitude of vibration of the second vibratory element.

References Cited in the file of this patent

UNITED STATES PATENTS

| | | |
|---|---|---|
| 2,340,507 | Bjork | Feb. 1, 1944 |
| 2,354,923 | McNamee | Aug. 1, 1944 |
| 2,839,915 | Roth et al. | June 24, 1958 |
| 3,014,363 | Labout | Dec. 26, 1961 |